Figures 1, 2:
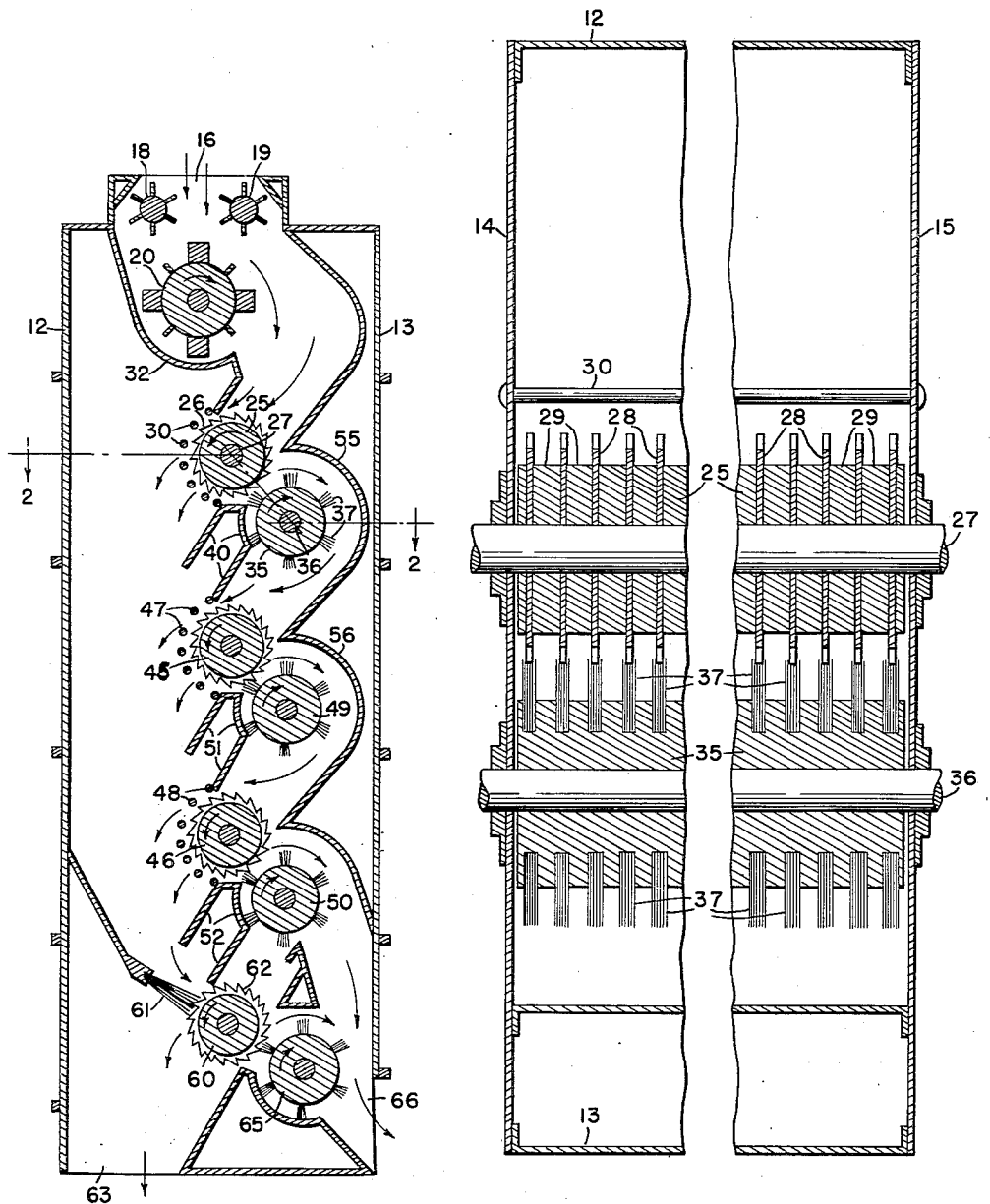

June 3, 1958  G. N. FRANKS  2,836,856
SEED COTTON CLEANER
Filed Aug. 24, 1955

INVENTOR
GERALD N. FRANKS

BY *J. G. Seegrist*
ATTORNEY

United States Patent Office 2,836,856
Patented June 3, 1958

2,836,856

SEED COTTON CLEANER

Gerald N. Franks, Greenville, Miss.

Application August 24, 1955, Serial No. 530,431

2 Claims. (Cl. 19—67)

(Granted under Title 35, U. S. Code (1952), sec. 266)

A non-exclusive, irrevocable, royalty free license in the invention herein described, throughout the world for all purposes of the United States Government, with the power to grant sublicenses for such purposes, is hereby granted to the Government of the United States of America.

The patent rights for the United States in any invention in the patent to be granted on this application are dedicated to the public.

This application is a continuation-in-part of my application S. N. 453,448, filed August, 31, 1954, now abandoned.

This invention relates to a cleaner for seed cottton and has among its objects the provisions of a cleaner which will remove sticks and stems from seed cotton in a simple and efficient manner, will not choke during operation, and will prevent any return of the debris to the seed cotton.

For a description of the invention in detail reference is made to the accompanying drawing in which Figure 1 is a central section of the cleaner, and Figure 2 is an enlarged section on line 2—2 of Figure 1 showing the parts structurally.

The casing of the cleaner, having a front panel 12, back panel 13, and side panels 14 and 15, is provided with an inlet 16 at its top through which harvested seed cotton containing sticks and stems which it is desired to remove is introduced into the cleaner. Means for regulating the speed of feeding the seed cotton of a usual construction is provided by oppositely rotatable feed rollers 18 and 19 about one foot apart extending between the side panels 14 and 15 and regulated as to feeding speed, a rotatable roller 20 being located below the feed rollers for its usual purpose of breaking up wads of the seed cotton.

A horizontal, rotatable extracting cylinder 25 having peripheral teeth 26 is positioned in the casing. The cylinder is provided with a shaft 27, discs 28 carrying the teeth 26, and spacers 29 of a usual construction, the shaft extending outside the casing to receive a conventional driven belt pulley (not shown).

A grid bar assembly horizontal spaced bars 30 is positioned along one side of the extracting cylinder, the direction of rotation of the cylinder being such that the teeth 26 move downwardly past the grid bars. A plate 32 leads from below the feed means to the top of the grid bar assembly. The seed cotton from the feed means falls alongside the plate and is received on the top portion of the extracting cylinder.

The construction is such that while the seed cotton is carried by the extracting cylinder past the grid bar assembly, the sticks and stems are centrifugally impelled through the spaces between the bars of the grid bar assembly while the the seed cotton is restrained on the extracting cylinder and carried by it past the grid bar assembly. Particular constructions were developed at the Cotton Ginning Laboratory of the U. S. Dept. of Agriculture. In one of these a 7 inch diameter extracting cylinder provided with conventional extracting type discs 28, grid bars 30 of ⅜ inch diameter, spaced ⅞ inch apart and spaced ¾ inch from the tips of the extracting cylinder teeth 26, was employed. In this instance a velocity of 1375 feet per minute for the tips of the teeth was satisfactory, although the velocity may be varied, as for example from 1100 feet per minute to 1500 feet per minute so long as the desired separation of sticks and stems from the cotton is obtained. Varying the size of the extracting cylinder effects the optimum velocity, the larger cylinder requiring the higher velocity. In another instance with a 21 inch diameter extracting cylinder and with other conditions the same as with the 7 inch diameter extracting cylinder a velocity of 3850 feet per minute for the tips of the teeth gave satisfactory results. The teeth tip velocity of such larger size cylinder may also be varied, as for example, from 3500 to 4000 feet per minute.

The cotton is removed from the extracting cylinder by a conventional doffer 35 provided with a drive shaft 36 and brushes 37.

A partition 40 extends below the extracting cylinder and doffer. The cleaned seed cotton falls along one side of this partition while the sticks and stems which have been removed from the seed cotton fall along the other side.

To increase the cleaning efficiency at least a second extracting cylinder, grid bar assembly, doffer, and partition, similar in construction to the first, are provided in series with the first and located in line therewith below the feed means. In the particular construction illustrated there are two additional sets, extracting cylinders 45 and 46, grid bar assemblies 47 and 48, doffers 49 and 50, and partitions 51 and 52, respectively.

Partition 40 leads from below grid bar assembly 30 to the top of the second grid bar assembly 47. Likewise partition 51 leads from grid bar assembly 47 to grid bar assembly 48.

The seed cotton is carried around and downwardly past the grid bars 30 by the extracting cylinder 25, thus expelling the sticks and stems while the partially cleaned cotton is doffed by doffer 35 and carried on to the second extracting cylinder 45 where it is further cleaned and is then carried on to the next extracting cylinder. Upon separation from the seed cotton, the sticks and stems fall down a common way to the left of the several grid bar assemblies and partitions.

As will be noted from Fig. 1 of the drawing a curved guide plate 55 is provided alongside of doffer 35 and a similar guide plate 56 alongside doffer 49. The cleaned seed cotton ejected from doffer 35 strikes guide plate 55 and is tumbled about as it is guided onto the top portion of extracting cylinder 45. This increases the cleaning efficiency since different side portions of the seed cotton in which sticks and stems may be entrained are thereby presented to the action of the extracting cylinder 45 than were presented to extracting cylinder 25. Guide plate 56 functions similarly relative to the two extracting cylinders 45 and 46.

When the seed cotton has passed the last extracting cylinder it may be discharged directly to any desired place of recovery and the sticks and stems discharged directly to discard.

However, since some cotton fibers are always present in the sticks and stems, it is desirable to recover the fibers. To accomplish this purpose a conventional cotton reclaimer is positioned in the path of the sticks and stems discharge. Such a reclaimer is provided with a slowly rotating toothed cylinder 60 and a flexible tined brush 61. The sticks and stems with accompanying cotton fibers fall onto the flexible tines of the brush and are guided against the pick-up teeth 62 of the cylinder. The cotton fibers cling to the teeth, while the sticks and stems fall through the tines of the brush, are discarded by the teeth and fall out of the discharge openings 63 for removal in any convenient manner. The fibers are doffed from the teeth by a conventional brush type doffer 65 and expelled into the stream of cleaned fiber and discharged therewith through the opening 66 for recovery.

I claim:

1. A seed cotton cleaner comprising a casing, an inlet at the top of the casing through which harvested seed cotton containing sticks and stems is intrduced into the cleaner, feed means for regulating the speed of feeding the seed cotton, a horizontal rotatable, extracting cylinder in the casing having peripheral teeth, a grid bar assembly having horizontal spaced bars positioned along one side of the extracting cylinder, the direction of rotation of the extracting cylinder being such that the teeth move downwardly past the grid bars, a plate leading from below the feed means to the top of the grid bar assembly so that the seed cotton is received on the top portion of the extracting cylinder, the construction and arrangement being such that sticks and stems are centrifugally impelled through the grid bar assembly and the cleaned seed cotton is carried by the extracting cylinder on past the grid bar assembly, a doffer for removing the cleaned seed cotton from the extracting cylinder, and a partition extending below the extracting cylinder and doffer along one side of which the cleaned seed cotton falls and the other side of which the sticks and stems fall.

2. A seed cotton cleaner comprising a casing, an inlet at the top of the casing through which harvested seed cotton containing sticks and stems is introduced into the cleaner, feed means for regulating the speed of feeding the seed cotton, a horizontal rotatable, extracting cylinder in the casing having peripheral teeth, a grid bar assembly having horizontal spaced bars positioned along one side of the extracting cylinder, the direction of rotation of the extracting cylinder being such that the teeth move downwardly past the grid bars, a plate leading from below the feed means to the top of the grid bar assembly so that the seed cotton is received on the top portion of the extracting cylinder, the construction and arrangement being such that sticks and stems are centrifugally impelled through the grid bar assembly and the cleaned seed cotton is carried by the extracting cylinder on past the grid bar assembly, a doffer for removing the cleaned seed cotton from the extracting cylinder, and a partition extending below the extracting cylinder and doffer along one side of which the cleaned seed cotton falls and the other side of which the sticks and stems fall, and at least a second extracting cylinder, grid bar assembly, doffer, and partition the constructions of which are similar to the first mentioned extracting cylinder, grid bar assembly, doffer, and partition, the second extracting cylinder, grid bar assembly, doffer, and partition being in series with the first and located in line therewith below the feed means, the first mentioned partition leading from below the first mentioned grid bar assembly to the top of the second grid bar assembly.

References Cited in the file of this patent

UNITED STATES PATENTS

| | | |
|---|---|---|
| 1,069,708 | Krupp | Aug. 12, 1913 |
| 1,914,893 | Mitchell | June 20, 1933 |
| 1,987,241 | Mackenzie | Jan. 8, 1935 |
| 2,379,353 | Mitchell | Mar. 27, 1956 |